US010712238B2

(12) United States Patent
Ledoux et al.

(10) Patent No.: US 10,712,238 B2
(45) Date of Patent: *Jul. 14, 2020

(54) SYSTEM FOR EVALUATING THE CONDITION OF A TIRE INCLUDING TIRE WEAR DETECTOR AND TIRE PRESENCE DETECTOR

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Thomas Ledoux, Clermont-Ferrand (FR); Denis Martin, Clermont-Ferrand (FR); Guillaume Heredia, Clermont-Ferrand (FR); Alexandre Pernot, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 43 days.

This patent is subject to a terminal disclaimer.

(21) Appl. No.: 15/535,251

(22) PCT Filed: Dec. 11, 2015

(86) PCT No.: PCT/EP2015/079465
§ 371 (c)(1),
(2) Date: Jun. 12, 2017

(87) PCT Pub. No.: WO2016/096667
PCT Pub. Date: Jun. 23, 2016

(65) Prior Publication Data
US 2017/0350792 A1 Dec. 7, 2017

(30) Foreign Application Priority Data
Dec. 17, 2014 (FR) ...................... 14 62594

(51) Int. Cl.
G01M 17/02 (2006.01)
G01B 13/24 (2006.01)
(Continued)

(52) U.S. Cl.
CPC ......... *G01M 17/021* (2013.01); *B60C 11/246* (2013.01); *G01B 13/24* (2013.01); *G01N 27/82* (2013.01)

(58) Field of Classification Search
CPC .................. G01M 17/021; B60C 11/246
(Continued)

(56) References Cited

U.S. PATENT DOCUMENTS 3,183,481 A 5/1965 McCrory .................. 340/52
5,554,907 A * 9/1996 Dixon ................. G08G 1/02
310/319

(Continued)

FOREIGN PATENT DOCUMENTS

DE 18 09 459 A1 6/1970
DE 20 2014 001 427 U1 4/2014
(Continued)

OTHER PUBLICATIONS

M. Devernier, U.S. Appl. No. 15/534,786, filed Dec. 16, 2015.
(Continued)

Primary Examiner — Tarun Sinha
(74) Attorney, Agent, or Firm — Venable LLP

(57) ABSTRACT

A system for evaluating a condition of a tire includes a housing placed on a ground surface, a wear detector that detects a wear condition of the tire when the tire passes over the housing, a tire presence detector that detects a presence of the tire over the housing, and an electronic activator that activates the wear detector during detection of the presence of the tire by the tire presence detector.

21 Claims, 4 Drawing Sheets

(51) Int. Cl.
  *B60C 11/24* (2006.01)
  *G01N 27/82* (2006.01)
(58) Field of Classification Search
  USPC .......................................................... 73/146
  See application file for complete search history.

(56) References Cited

U.S. PATENT DOCUMENTS

| | | | | |
|---|---|---|---|---|
| 6,867,690 | B2* | 3/2005 | Gioutsos | B60N 2/002 200/61.54 |
| 7,797,995 | B2* | 9/2010 | Schafer | B60C 11/24 73/146 |
| 10,222,299 | B2 | 3/2019 | Ledoux et al. | |
| 2002/0169439 | A1 | 11/2002 | Flaherty | 604/891.1 |
| 2003/0050743 | A1* | 3/2003 | Caretta | B60C 23/066 701/1 |
| 2004/0069075 | A1* | 4/2004 | Jakoby | B60R 21/01516 73/862.046 |
| 2006/0081042 | A1 | 4/2006 | Silverbrook et al. | |
| 2007/0001059 | A1* | 1/2007 | Appleby | B61L 1/06 246/122 R |
| 2008/0084180 | A1 | 4/2008 | Hasegawa | 320/112 |
| 2008/0256815 | A1 | 10/2008 | Schafer | 33/739 |
| 2009/0000370 | A1 | 1/2009 | Lionetti et al. | 73/146 |
| 2009/0049936 | A1* | 2/2009 | Mian | G01M 17/10 73/865.8 |
| 2010/0011856 | A1* | 1/2010 | Nagata | G01C 19/56 73/504.12 |
| 2010/0139383 | A1* | 6/2010 | Haswell | B60C 11/24 73/146 |
| 2013/0154855 | A1* | 6/2013 | Yoo | G08G 1/042 340/935 |
| 2016/0153763 | A1 | 6/2016 | Ledoux et al. | G01M 17/02 |
| 2016/0161243 | A1 | 6/2016 | Ledoux et al. | G01B 7/26 |
| 2016/0169657 | A1 | 6/2016 | Ledoux et al. | G01B 7/26 |
| 2017/0038278 | A1 | 2/2017 | Ledoux et al. | 17/20 |
| 2017/0322012 | A1 | 11/2017 | Ledoux et al. | |
| 2017/0322117 | A1 | 11/2017 | Ledoux et al. | |
| 2017/0341659 | A1 | 11/2017 | Duvemier et al. | |
| 2017/0350781 | A1 | 12/2017 | Ledoux et al. | |
| 2018/0009271 | A1 | 1/2018 | Ledoux et al. | |

FOREIGN PATENT DOCUMENTS

| | | |
|---|---|---|
| EP | 0 469 948 A1 | 2/1992 |
| EP | 0 656 269 A1 | 6/1995 |
| FR | 2 201 511 | 4/1974 |
| GB | 2 443 965 A | 5/2008 |
| GB | 2 512 411 A | 10/2014 |
| WO | WO 2006/098714 A1 | 9/2006 |
| WO | WO 2007/059935 A1 | 5/2007 |

OTHER PUBLICATIONS

T. Ledoux, U.S. Appl. No. 15/535,138, filed Dec. 11, 2015.
T. Ledoux, U.S. Appl. No. 15/535,276, filed Dec. 16, 2015.
T. Ledoux, U.S. Appl. No. 15/535,150, filed Dec. 11, 2015.
T. Ledoux, U.S. Appl. No. 15/535,210, filed Dec. 11, 2015.
International Search Report issued by WIPO dated Feb. 17, 2016, in connection with International Application No. PCT/EP2015/079465 (with English translation attached).
Feb. 17, 2016 Search Report and Written Opinion in International Patent Appln. No. PCT/EP2015/079465.

* cited by examiner

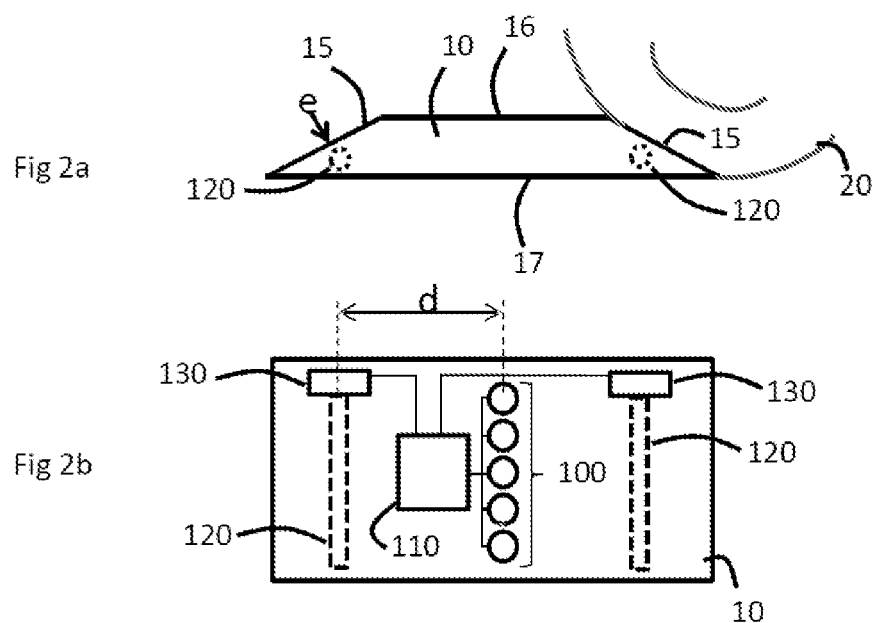
Fig 2a
Fig 2b
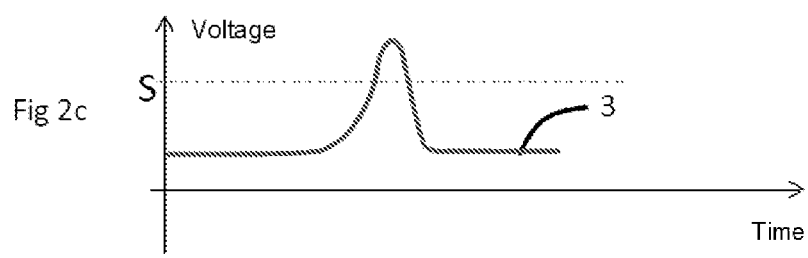
Fig 2c

SYSTEM FOR EVALUATING THE CONDITION OF A TIRE INCLUDING TIRE WEAR DETECTOR AND TIRE PRESENCE DETECTOR

FIELD OF THE INVENTION

The present invention relates to a system for evaluating the condition of a tire, and more particularly the wear condition of a tire.

RELATED ART

As is known, the tire tread of a pneumatic tire, whether it is intended to be provided on a passenger, heavy goods, civil engineering or other vehicle is provided with a pattern comprising, in particular, pattern elements or elementary blocks delimited by various main longitudinal, transverse or else oblique grooves, wherein the elementary blocks can further include various incisions or thinner sipes. The grooves form channels for draining off water when travelling on wet ground and define the leading edges of the pattern elements.

When a pneumatic tire is new, the tread is at the maximum height thereof. This initial height can vary depending on the type of pneumatic tire in question and the use for which it is intended; for example, "winter" pneumatic tires generally have a pattern depth greater than that of "summer" pneumatic tires. When the pneumatic tire wears down, the height of the elementary blocks of the pattern decreases and the stiffness of these elementary blocks increases. The increase in stiffness of the pattern elementary blocks leads to a reduction of some performance levels of the pneumatic tire, such as the grip on wet ground. In addition, the water draining capacities decrease significantly when the depth of the channels of the patterns decreases.

It is therefore desirable to be able to monitor the progression of the wear of the tread of a pneumatic tire.

A measurement system comprising a running bench intended to accommodate the passage of a vehicle is known from document US 2009/0000370. The system comprises an energy source that emits a wireless signal in the direction of the tire, and a sensor which detects a signal emitted in return by the tire. Using this return signal, a monitoring unit determines the depth of the pattern of the tire. However, it was found that this system requires a constant power supply to the various elements, and thus only offers low autonomy.

The aim of the present invention, therefore, is to overcome this disadvantage, by proposing an autonomous system for evaluating the condition of a tire.

BRIEF DESCRIPTION OF THE INVENTION

Therefore, the invention proposes a system for evaluating the condition of a tire, the system comprising a first housing placed on the ground and a device for detecting the wear of a tire when the tire passes over said first housing, said system further comprising
 a first device for detecting the presence of a tire over the first housing, and
 electronic means for activating the wear detecting device during the detection of the presence of a tire by the presence detecting device.

The device for detecting wear comprises, in an advantageous embodiment, a housing with an application face intended to be in contact with the surface of the tire and a sensor placed in the housing capable of measuring the distance which separates the said sensor from the metal reinforcements constituting the tire. The sensor has, for example, a static or alternating magnetic field source and an adjacent sensing element, the source being a coil or a permanent magnet and the sensing element being a sensor, the output signal of which can, for example, depend on the level of the local magnetic induction field. In this case, the sensing element is positioned such that the strength of the magnetic field varies when the distance d decreases.

In an embodiment, the sensing element is selected from the group of the Hall effect or magneto-resistive sensors. Alternatively, the sensing element is a coil.

In another embodiment, the sensor capable of measuring the distance which separates the said sensor from the metal reinforcements constituting the tire is an eddy-current-based sensor.

Whatever type of sensor is used, the detection device advantageously comprises several sensors of the same type, installed in the housing laid on the ground.

In a preferential embodiment, the system is such that the distance, projected on a surface parallel to the running ground, between the first presence detection device or an access ramp for accessing the housing and the wear detection device is greater than the distance traveled by a vehicle at a predetermined speed in a time corresponding to the time required for the activation of the wear detection device.

The time required for the activation of the wear detecting device is, for example, approximately ten milliseconds. The predetermined speed is, for example, a maximum speed recommended for the use of the evaluating system, or a speed above which the proper operation of the system is not guaranteed for a user.

In an advantageous embodiment, the first device for detecting the presence of a tire comprises at least one sensor sensitive to the variation in strength and/or in orientation of the terrestrial magnetic field. Indeed, the approach of a vehicle or of a tire causes local variations of the terrestrial magnetic field, which variations can be detected and used as indication of the presence of a tire over the system. A magnetometer will, for example, be chosen, preferentially selected for its low electrical consumption when on standby and when operating, advantageously less than 600 µA.

In an advantageous embodiment, the first device for detecting the presence of a tire comprises at least one extensometer, for measuring the deformations induced on the housing during the presence of a vehicle. One or more resistance wire extensometers, also called strain gauges or deformation gauges in the subsequent description, will for example be used. These strain gauges will be installed in series and/or in parallel, and connected to central electronics of the evaluation system. They are advantageously installed in cavities made in the housing, for example at the level of access ramps for accessing the housing. These various configurations will be detailed subsequently with the aid of figures.

In an advantageous embodiment, the first device for detecting presence of a tire comprises at least one leaktight cavity accommodating a fluid and a pressure sensor installed so as to measure the pressure of the fluid in this cavity. In a preferential manner, several cavities are made in an access ramp of the housing. These cavities are filled with a fluid, for example air or a liquid, at a pressure close to atmospheric pressure. The arrival of a tire over the housing causes an increase in pressure of the fluid in the cavity, detected by the pressure sensor, and which can be used as indicator of the presence of a vehicle over the housing. In another example, a mechanical contact detector, implementing a flexible plate, will be used. This contact detector is positioned at an end of the cavity, and subjected to a motion of the fluid should the pressure in the cavity increase. This detector closes electrically when a vehicle is present over the housing.

In another advantageous embodiment, the first presence detection device comprises at least one accelerometer, preferably chosen to be sensitive to the vibrations caused by the arrival of a tire over the housing. This accelerometer will advantageously be chosen for its low consumption when on standby and when operating, preferentially less than 600 µA. In another embodiment, the presence detection device comprises a sensor sensitive to shocks.

In an advantageous embodiment, the presence detecting device is directly fixed on the housing, for example in a cavity made in the housing. Thus, the detecting device can be positioned parallel to the ground receiving the housing, or in another direction. Preferably, the device is protected from external attack, such as rain. Thus, in another embodiment, the device may be embedded in the material forming the housing, or in an additional protective resin.

In another embodiment, the system comprises a second device for detecting the presence of a tire, similar to the first presence detecting device. In a first use, this device can be used to detect the end of the passage of a vehicle over the housing, and can thus be used as a means of switching off the wear detecting device.

In a second use, the evaluating system can be used regardless of the direction of approach of a vehicle. Thus, the presence detecting device chronologically activated first is used to activate the wear detecting device. Advantageously, the presence detecting device chronologically activated second is used to switch off the wear detecting device.

In this second use, the positioning of the second presence detecting device follows the same distance rules as described above for the first presence detecting device. This positioning will be detailed later using figures.

In another embodiment, the system comprises means for detecting that the output value of the wear detecting device becomes lower and/or higher than a predetermined threshold, and for accordingly commanding the switching-off of detecting device.

In an advantageous embodiment, the system further comprises means for adjusting the sensitivity of the tire presence detecting device.

Adjusting the sensitivity allows, for example, the option of only detecting those vehicles above a certain weight. In particular, this allows for activating the system only when a heavy goods vehicle of which the evaluation is desired passes thereover, and for not activating the system when a light vehicle passes thereover in an untimely manner. Depending on the detection devices used, this adjustment of the sensitivity can be performed by altering the stiffness of the material constituting the housing, and/or the thickness of the housing at the level of the detection device.

In this case, the sensitivity adjusting means are, for example, electronic means, such as are described later using the figures.

In an advantageous embodiment, the electronic means for activating the wear detection device comprise means for modifying a mode of operation of the various microcontrollers of the wear detection device.

In another embodiment, the electronic means for activating the wear detecting device comprise means for acting upon the power supply of the wear detecting device. More precisely, the electronic means can act upon the power supply of the mother board of the wear detecting device, but also on the power supply of the RFID reading functionalities of the detecting device, or finally on the radio information transmission functionalities of said device.

BRIEF DESCRIPTION OF THE FIGURES

Other aims and advantages of the invention will appear clearly in the following description of a preferred, but nonlimiting, embodiment, illustrated by the following figures wherein.

DESCRIPTION OF THE PREFERRED EMBODIMENT OF THE INVENTION

Figure 1:
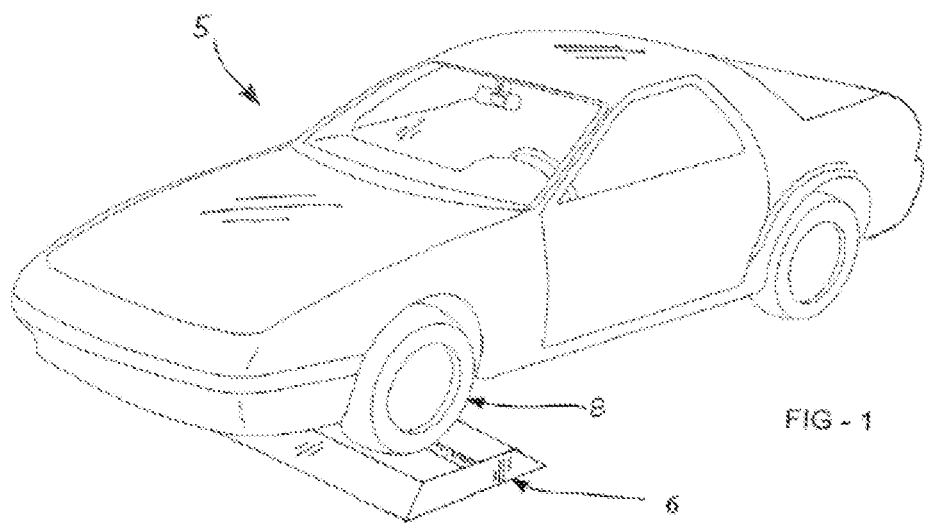
FIG. 1 is a perspective view of a vehicle, a tire of which passes above a housing belonging to a system according to the invention, FIGS. 2a, 2b and 2c; 3a, 3b and 3c; 4a and 4b show respectively three embodiments of a system according to the invention, implementing various presence detection devices.

FIG. 1 shows a vehicle 5, the tire 8 of which travels over a housing 6 which is part of an evaluating system according to the invention. The figure shows a passenger vehicle but such a system can also be used for any other vehicle, such as a heavy goods vehicle or a bus. The wear condition of the tire 8 is detected when the tire rolls over the housing 6 without it being necessary to stop the vehicle or remove the tire of the vehicle.

In this embodiment, the housing is in the form of a land vehicle speed bump made of a material suitable for resisting multiple tires passing thereover without it deteriorating. The material is, for example, a composite based on vinyl ester resin, reinforcing fibreglass, and various additives well known to a person skilled in the art.

However, the invention is not restricted to this embodiment, and the housing can take any other form of portable object having a plane lower surface allowing positioning on a running ground. Thus, in a particularly favourable embodiment, the ground on which the housing is laid is prepared with a suitable concrete and a fine screed, making it possible to obtain good planarity.

FIGS. 2a, 2b and 2c show an exemplary embodiment of the system according to the invention consisting of a housing 10 containing the device for measuring wear and two tire presence detection devices, as well as an example of signals captured by the tire presence detection devices contained in the said housing.

In this example the tire presence detection device is sensitive to the deformation of the housing during the passage of a tire 20. The housing is made up of two access ramps 15 and of a horizontal wear measuring zone 16.

In the example of FIGS. 2a, 2b and 2c, the housing comprises, in each ramp 15, a device for detecting presence of a tire comprising a cavity 120 and a sensor 130. The cavity 120, made in the access ramp 15, is filled with a fluid, for example air or a liquid, at a pressure close to atmospheric pressure. Each of the cavities 120 has a slimline shape, and is positioned along a direction orthogonal to the direction of rolling of a vehicle arriving over the housing. Advantageously, the length of the cavity 120 is such that the detection of tire presence can be done whatever the position of the tire over the system according to the invention.

The cavities 120 are produced so as to be perfectly leaktight, in order to avoid any modification of the pressure due to possible fluid leaks.

In each of these cavities is installed a sensor 130 sensitive to the increase in the pressure in the cavity 120. Thus, when a tire 20 passes over the access ramp 15, the deformation of the structure of the housing 10, at the level of the cavity 120, causes an increase in the pressure in the said cavity. This increase in pressure is then detected by the sensor 130 whose output signal can be used to determine the presence of a vehicle over the housing.

The sensor 130 is, for example, a pressure sensor whose passband and sensitivity are advantageously chosen so as to allow the detection of a tire. It may also be a mechanical contact detector with flexible plate.

In the example of FIGS. 2a, 2b and 2c, each access ramp 15 is furnished with a presence detection device. This exhibits the advantage of rendering the system insensitive to the direction of rolling of the vehicle, since the latter may arrive over the system via one or the other of the access ramps 15.

The sensors 130 are linked to an electronic unit 110, which is used to perform the evaluation of the wear of the tire by wear sensors 100. The output signal 3 of a pressure sensor 130, shown in FIG. 2c, is also used by the unit 110. Indeed, in the case where the sensor 130 is a pressure sensor, these electronics 110 can contain threshold-based electronics which act so as to wake up the device for measuring wear when a vehicle is detected.

Advantageously, the level of the threshold S, visible in FIG. 2c, is adjusted so as to avoid waking the device if a low pressure is generated, for example by the passing of a pedestrian over the access ramp 15.

It is also possible to adjust the sensitivity of the system by altering the stiffness of the material constituting the housing 10, or the thickness e of the structure at the level of the cavity 120 under the access ramp 15.

Alternatively, the pressure sensor 130 can be replaced with a mechanical contact detector, implementing a flexible plate.

Moreover, the distance d between the presence detection device, here in the form of a cavity 120, and the wear detection device, here in the form of sensors 100, must be sufficient for the electronic unit 110 to be able to be activated by the sensors 130 before the tread of the tire reaches the sensors 100.

This distance d is calculated as a function of the maximum speed at which the vehicles will pass over the system, as a function of the response time of the tire presence detection device, and by taking account of the time required for waking up and/or for booting the various electronic functions of the system.

In an example, the recommended vehicle speed for the use of an evaluation system according to the invention is fifty km/h. If the time required for the activation of the unit 110 is of the order of ten ms and the response time of the presence detection device is also of the order of ten ms, this implies that the distance d must be greater than twenty-eight centimetres in order to guarantee correct wear detection. Preferentially, the distance d is less than 1 metre, to guarantee the lowest possible bulk and cost of the system.

In a particular embodiment, the electronic unit 110 comprises several elements useful for the operation of the wear detection device, notably:

an RFID reader which allows the identification of the tire or of the vehicle, by means of an antenna allowing the reading of an RFID chip integrated into the tire or positioned on the vehicle;
a wireless communication module for sending the information remotely, via an additional antenna; and
a power supply distributing the current necessary for the entire system from a battery.

Figure 3A:
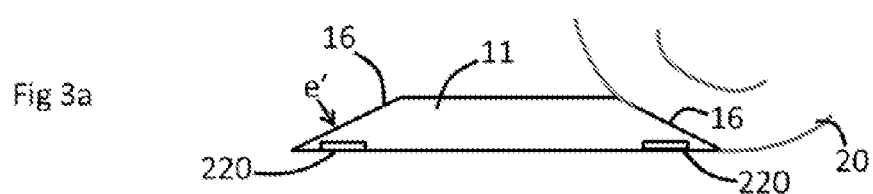
Figure 3B:
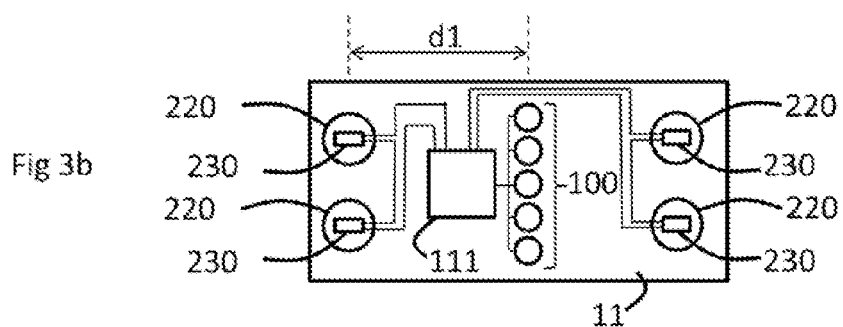
Figure 3C:
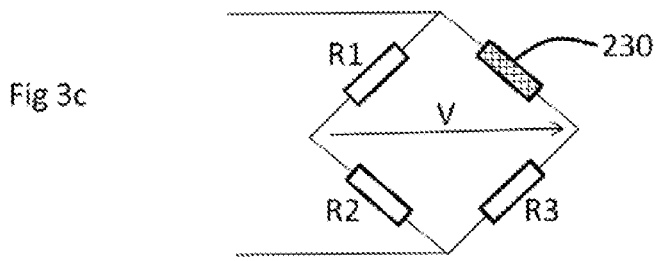

FIGS. 3a, 3b and 3c show another exemplary embodiment of the system according to the invention in which the tire presence detection device is embodied by means of strain gauges 230 and is therefore sensitive to the deformation of the structure of the housing 11 of the wear measuring system.

In this example, two strain gauges 230 are installed under each access ramp 16. Each of these gauges is installed in a cavity 220 made in the lower surface of the access ramp. More precisely, each of these gauges is fixed securely to the bottom of the cavity 220, the bottom corresponding in this case to the plane furthest from the ground.

The two gauges situated under one and the same access ramp are, in an example, mounted in series and connected to the central electronics 111 of the system according to the invention.

FIG. 3c shows an exemplary configuration of the strain gauges, implemented in the electronics 111. In this example, a Wheatstone bridge layout is used to convert the strain measured by one or more gauges into a voltage V. This bridge consists of a gauge 230, likened to a variable resistor, and three fixed resistors R1, R2 and R3.

Indeed, a mechanical deformation undergone by the strain gauge is manifested by a variation of the electrical resistance of this gauge, which itself is manifested by a variation of the voltage V. It is then possible to detect a presence of a vehicle over the housing by detecting a variation of the voltage V. In an advantageous manner, the fixed resistors R1, R2 and R3 are chosen so as to guarantee a zero voltage V in the absence of strain.

The layout illustrated in FIG. 3c is described non-limitingly. Indeed, it would be possible to replace one of the fixed resistors by another strain gauge. It would also be possible to replace the gauge 230 by several gauges connected in series. In the same manner, it would be possible to use a Wheatstone bridge layout for each of the access ramps, or else use a common layout for the whole system. Furthermore, the electronics 111 contain threshold-based electronics so as for example to avoid waking the system if a small strain is measured by any one of the gauges, for example when a person walks over the access ramp 16.

As previously, it is possible to adjust the sensitivity of the system by modifying the stiffness of the material constituting the housing 11 or by altering the thickness e' of the housing vertically in line with the cavity 220.

The distance d1 separating the strain gauges 230 constituting the tire presence detection device from the line of wear sensors 100, must be sufficient for the electronic unit 111 to be able to be activated by the gauges 230 before the tread of the tire reaches the sensors 100. This distance d1 is calculated as a function of the maximum speed at which the vehicles will pass over the system, and by taking account of the time required for waking up and/or for booting the various electronic functions of the system.

Figure 4A:
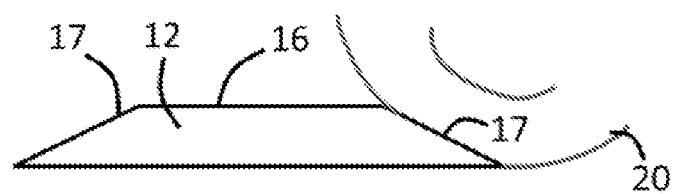
Figure 4B:
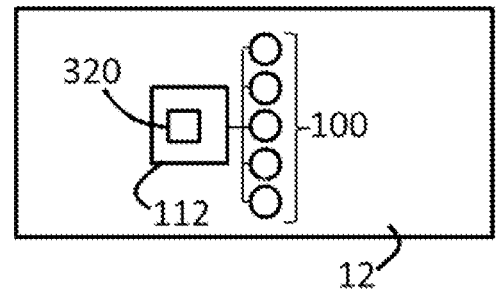

FIGS. 4a and 4b represent an embodiment in which the tire detection device is sensitive to a shockwave caused by the arrival of a tire 20 over the wear detection device.

In this example, the housing of the wear measuring system 12 is in the form of a land vehicle speed bump produced from a material that is suitable for resisting multiple tires passing thereover without it deteriorating. This housing 12 consists of two access ramps 17 and of a horizontal wear measurement zone 16. Several wear measurement sensors 100 are installed inside this housing.

The housing further comprises an electronic board 112 which allows the management of the measuring process, the identification of the vehicle and of the tires via RFID reading and the radiofrequency transmission of all of the information to a remote database.

This electronic board is, for example, activated by means of the sensor 320, when a tire arrives over the system. In a variant, the sensor 320 can be linked electrically to the electronic board 112, but fixed on the structure of the housing 12.

In the example of FIGS. 4a and 4b, this sensor is an accelerometer chosen preferably so as to be sensitive to the vibrations caused by the arrival of a tire 20 over either one of the access ramps 17. In a preferential manner, use is made of an accelerometer selected for its low electrical consumption when on standby and when operating which advantageously will have to be less than 600 μA.

In a second variant, the sensor can be a sensor sensitive to shocks, for example a normally closed sensor which becomes open when it is subjected to a vibration. Thus, upon the arrival of a tire over either one of the access ramps 17 of the housing 12, the shock created by the tire is transmitted in the form of vibration in the structure of the wear measuring system, up to the sensor 320.

The output signal of the sensor 320 evolves as a consequence and the wear measuring system is woken up by means, for example, of threshold-based electronics.

In a variant, the sensor 320 may also be a sensor sensitive to the local variations of orientation or strength of the terrestrial magnetic field that are caused by the approach of a vehicle or of a tire. This sensor may for example be a magnetometer.

The embodiment shown in FIGS. 4a and 4b presents the advantage of requiring only a single connection between the presence detection device and the wear detection device. On the contrary, in the embodiments presented in the previous figures, it is necessary to effect a connection between each tire detection device and the electronic unit 112.

The invention claimed is:

1. A system for evaluating a condition of a tire, the system comprising:
    a housing placed on a ground surface;
    a wear detector that detects a wear condition of a tire when the tire passes over the housing;
    a tire presence detector attached to or embedded within the housing that detects a presence of the tire over the housing;
    an electronic controller that activates the wear detector during detection of the presence of a tire by the tire presence detector, and that deactivates the wear detector in response to a subsequent detection of presence of a tire,
    wherein the tire presence detector is configured to detect a presence of the tire over the housing by using a threshold to discriminate between different objects of respectively different weights.

2. The system according to claim 1, wherein a distance, projected on a surface parallel to the ground surface, between the wear detector and the tire presence detector or an access ramp for accessing the housing is greater than a distance traveled by a vehicle at a predetermined speed in a time corresponding to a time required for activation of the wear detector,
    wherein the system further comprises an adjuster that adjusts a sensitivity of the tire presence detector,
    wherein the adjuster is configured to change the threshold,
    wherein the tire presence detector and the electronic controller are configured so that the wear detector is activated for a first vehicle and not for a second vehicle lighter than the first vehicle, and
    wherein the tire presence detector and the electronic controller are configured so that the wear detector is activated for a vehicle and not for a pedestrian.

3. The system according to claim 1, wherein the tire presence detector comprises a sensor that is sensitive to a variation in at least one of: a strength of a terrestrial magnetic field and an orientation of the terrestrial magnetic field.

4. The system according to claim 1, wherein the tire presence detector comprises an extensometer.

5. The system according to claim 1, wherein the tire presence detector comprises (a) a leak-tight cavity accommodating a fluid and (b) a pressure sensor installed therein to measure a pressure of the fluid in the cavity.

6. The system according to claim 1, wherein the tire presence detector comprises an accelerometer.

7. The system according to claim 1, wherein the tire presence detector comprises a sensor sensitive to shock.

8. The system according to claim 1, wherein the tire presence detector is fixed directly on the housing.

9. The system according to claim 1, wherein the tire presence detector is fixed on a printed circuit board or a stiff board formed of a material having a stiffness less than that of a material forming the housing, and
    wherein the printed circuit board or the stiff board is fastened to the housing.

10. The system according to claim 1, wherein the tire presence detector is embedded in a material forming the housing.

11. The system according to claim 1, further comprising a second tire presence detector that carries out the subsequent detection of presence of a tire.

12. The system according to claim 1, further comprising an adjuster that adjusts a sensitivity of the tire presence detector.

13. The system according to claim 12, wherein the adjuster is configured to change the threshold.

14. The system according to claim 2, wherein the tire presence detector has an operating electrical consumption less than 600 μA.

15. The system according to claim 1, wherein the tire presence detector and the electronic controller are configured so that the wear detector is activated for a first vehicle and not for a second vehicle, the first vehicle being heavier than the second vehicle.

16. The system according to claim 1, wherein the tire presence detector and the electronic controller are configured so that the wear detector is activated for a vehicle and not for a pedestrian.

17. A system for evaluating a condition of a tire, the system comprising:
    a housing placed on a ground surface;
    a wear detector that detects a wear condition of a tire when the tire passes over the housing;
    a tire presence detector that detects a presence of the tire over the housing; and
    an electronic controller that activates the wear detector during detection of the presence of a tire by the tire presence detector,
    wherein one of the following conditions is satisfied: (a) the tire presence detector comprises an extensometer that is disposed in the housing and that is a component of a Wheatstone bridge or (b) the tire presence detector comprises at least one accelerometer that is disposed in the housing and that activates the wear detector in response to a detection by the at least one accelerometer and that deactivates the wear detector in response to a subsequent detection by the at least one accelerometer.

18. The system according to claim 17, wherein condition (a) is satisfied.

19. The system according to claim 17, wherein condition (b) is satisfied.

20. A system for evaluating a condition of a tire, the system comprising:
   a housing placed on a ground surface;
   a wear detector that detects a wear condition of a tire when the tire passes over the housing;
   a tire presence detector that detects a presence of the tire over the housing; and
   an electronic activator that activates the wear detector during detection of the presence of a tire by the tire presence detector,
   wherein the tire presence detector comprises, within the housing, (a) a leak-tight cavity accommodating a fluid and (b) a pressure sensor installed therein to measure a pressure of the fluid in the cavity, and
   wherein the cavity is configured so as to be longer in a direction of a width of the tire than in a direction in which the tire passes over the housing.

21. The system according to claim 1, wherein the threshold is a voltage threshold.

\* \* \* \* \*